Patented Feb. 7, 1950

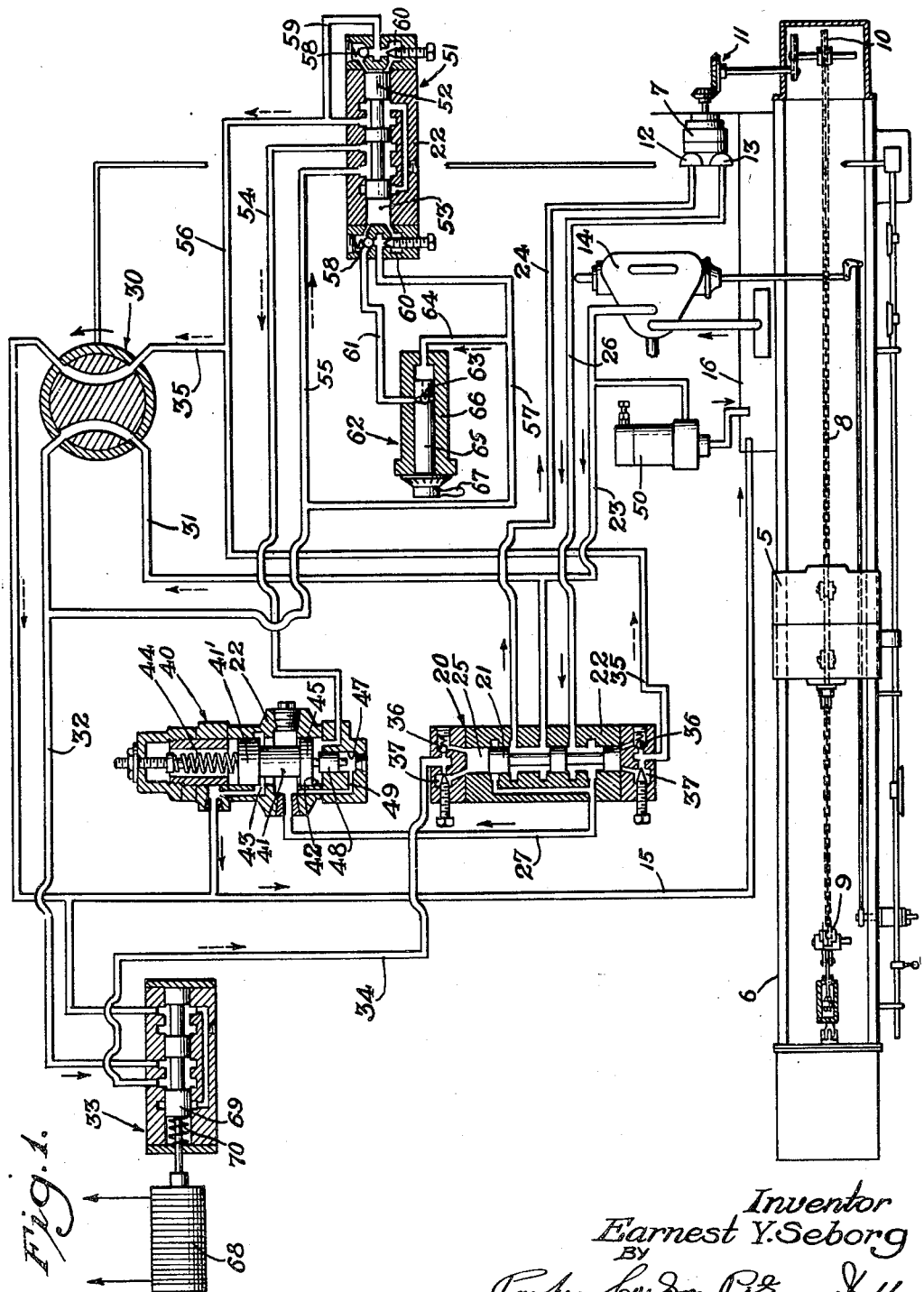

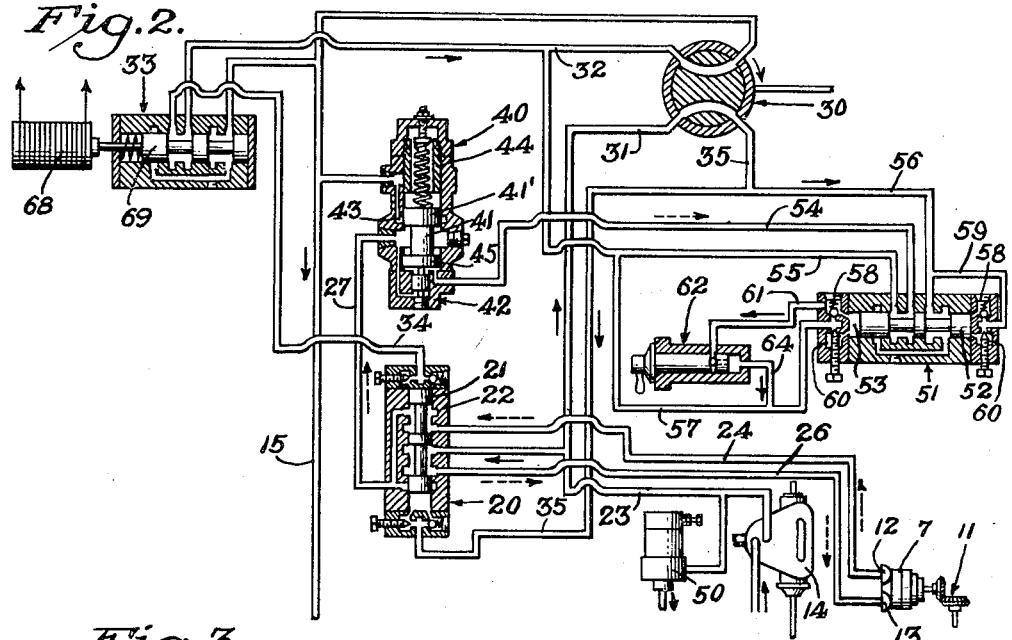
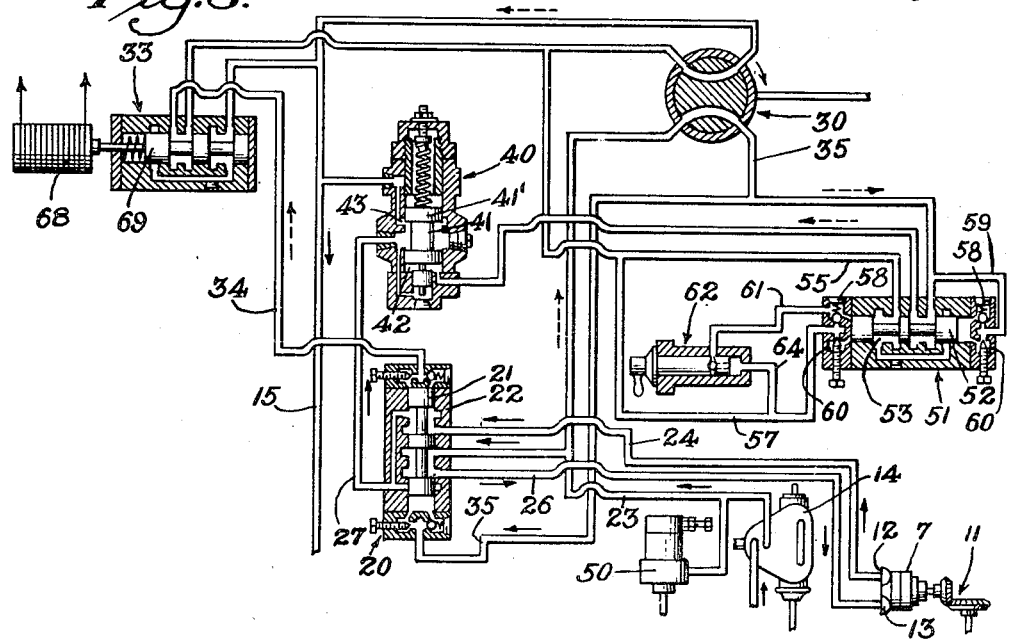

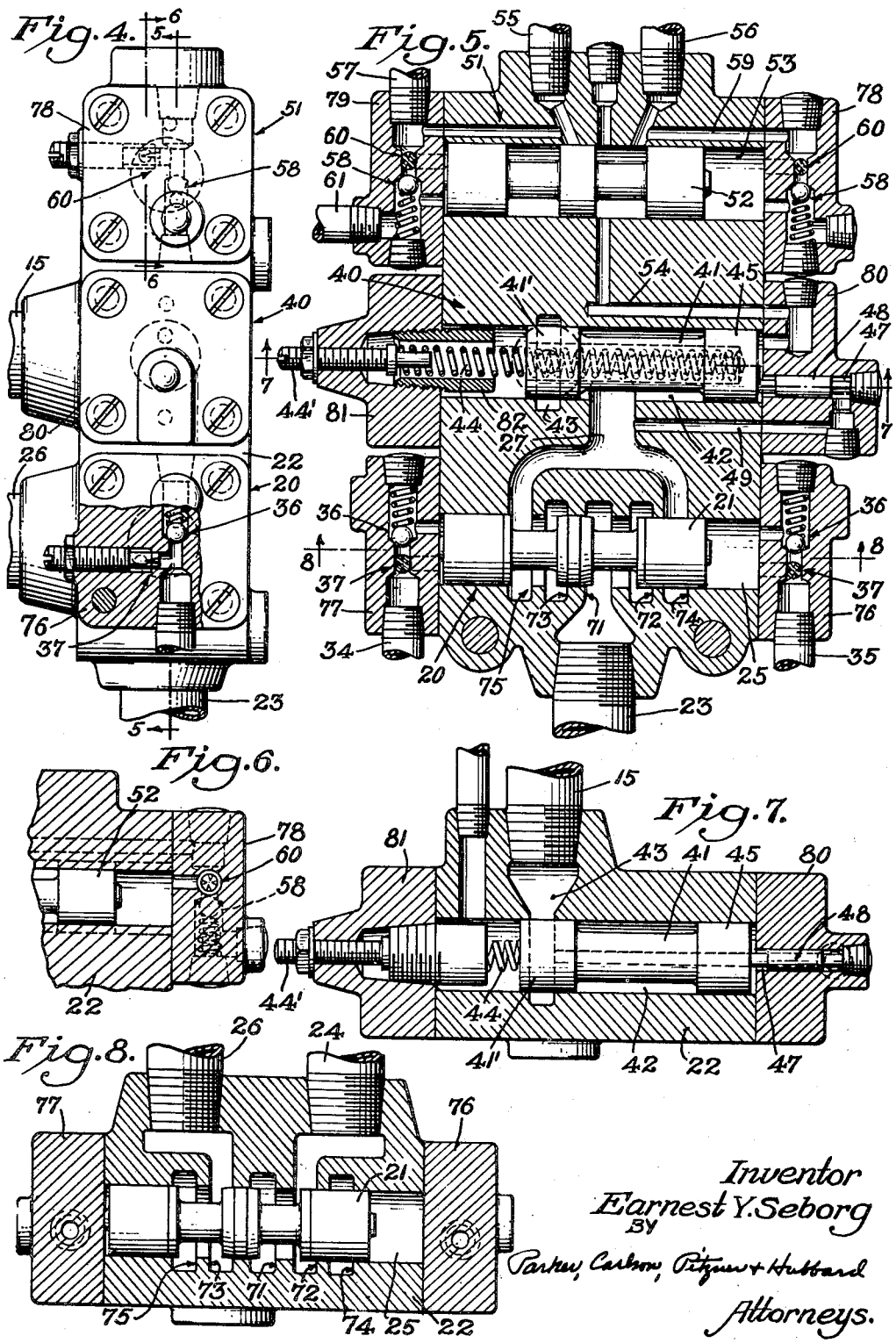

2,496,756

UNITED STATES PATENT OFFICE 2,496,756

CONTROL SYSTEM FOR HYDRAULICALLY DRIVEN MACHINE TOOL ELEMENTS

Earnest Y. Seborg, Rockford, Ill., assignor to Barnes Drill Co., Rockford, Ill., a corporation of Illinois Application May 26, 1943, Serial No. 488,575

8 Claims. (Cl. 121—45)

The invention relates to the control of hydraulically driven machine tool elements and has for its general object the provision of an improved control system for interrupting the movement of a hydraulically driven machine tool element at a precise point in its travel and for initiating reverse movement of the element after a predetermined timed delay or dwell.

Still another object is to provide a control system adapted to confine the movements of a machine element within accurately defined limits without the use of fixed stops or bumpers and embodying means for introducing a timed delay in the return movement of the element from one limit position.

A further object is to provide a control system for a reversible hydraulic motor including a dwell mechanism operative under control of the pilot valve which controls the direction of operation of the motor to temporarily block the exhaust from the motor and thereby prevent its operation for a predetermined interval.

Another object is to provide a compact, unitary valve assembly of novel and advantageous construction particularly suitable for controlling the reciprocation of a machine tool element.

Other objects and advantages of the invention will become apparent from the following detailed description of the preferred embodiment illustrated in the accompanying drawings in which:

Figure 1 is a view, partly diagrammatic, showing the relationship of the mechanical and hydraulic elements of a machine tool equipped with a control system embodying the features of the invention.

Fig. 2 is a diagrammatic view of the hydraulic operating and control circuits with the controls set for introducing a dwell in the return movement of a machine element.

Fig. 3 is a view similar to Fig. 2 showing the controls set for imparting return movement to the machine element.

Fig. 4 is an end elevational view of the improved unitary valve structure.

Fig. 5 is a sectional view taken in a vertical plane substantially on the line 5—5 of Fig. 4.

Fig. 6 is a sectional view taken in a vertical plane substantially on the line 6—6 of Fig. 4.

Fig. 7 is a sectional view taken in a horizontal plane substantially on the line 7—7 of Fig. 5.

Fig. 8 is a sectional view taken in a horizontal plane substantially on the line 8—8 of Fig. 5.

The improved control system is adapted for use with various machine structures having a movable element arranged to be shifted back and forth by a reversible hydraulic motor or actuator. It is particularly suited for use in machine tools in which the movable element may constitute a linearly reciprocable head, carriage or table. In such machine tools, it is usually necessary to confine the movements of the reciprocating element within accurately defined limits and it is frequently desirable to introduce a delay or dwell at one or both ends of the reciprocatory stroke. The present invention aims to provide a system of control operative to regulate the movements of the machine element under the conditions above set forth.

In carrying out the invention I provide a reversing valve for defining the limits of the reciprocatory strokes of the machine element and additional valve means operating in timed relation with the reversing valve to quickly stop the hydraulic motor driving the machine element at a precise point in its travel and to prevent reverse movement of the element for a predetermined interval. The means for timing the stoppage or dwell of the machine element is preferably in the form of a delayed action valve adapted to be adjusted to produce a dwell of any desired length.

For purposes of illustration, the invention has been shown and will be described herein as applied to a horizontal honing machine of the general class disclosed in the patent to Harry J. Caldwell No. 2,247,479, issued July 1, 1941. As shown in Fig. 1 of the drawings the machine comprises a movable element or head 5 supported for reciprocation on an elongated horizontal base 6. The head is driven back and forth on the bed by means of a reversible hydraulic actuator of any suitable type. As herein shown, the actuator comprises a rotary hydraulic motor 7 drivingly connected with the head by a flexible driving member or chain 8 connected at opposite ends to the head and looped over sprocket wheels 9 and 10 rotatably supported at opposite ends of the bed. The latter sprocket wheel is driven by the motor through suitable speed reduction gearing indicated generally at 11.

The motor 7 has two ports 12 and 13 adapted to act alternately as inlet and outlet ports, that is, either one of the ports is connected to a source of pressure fluid while the other serves as an exhaust for spent pressure fluid. In the particular circuit organization illustrated, the source of pressure fluid comprises an adjustable delivery pump 14 adapted to be driven continuously by a motor (not shown). When fluid from the pump is supplied to the motor port 12, the motor runs in a direction effective to move the head 5 forwardly or to the left as viewed in Fig. 1. Spent pressure fluid is exhausted through the port 13 and returned by way of an exhaust line 15 to a sump or reservoir 16 from which it may be drawn for re-use by the pump. When the connections to the motor are reversed, that is, when pressure fluid is supplied to the port 13 and spent pressure fluid exhausted through the port 12, the motor runs in the opposite direction and imparts return movement to the head. The direction of fluid flow is indicated in the drawings by solid line arrows. Where fluid flow is only momentary, the direction of such flow is indicated by broken line arrows.

The connections to the motor 7 are controlled selectively by a reversing valve 20 which may be of any suitable type. The exemplary valve is a conventional spool type valve comprising a valve member or plunger 21 shiftable within a cylindrical chamber 25 in a housing 22. Introduction of pressure fluid into the ends of the chamber 20 serves to shift the valve plunger between forward and reverse positions.

In the forward position of the valve plunger, as shown in Fig. 1, pressure fluid supplied by the pump 14 is delivered to the reversing valve through a main pressure line 23 and is directed by the valve through a supply line 24 to the motor port 12 to drive the motor in a forward direction. Fluid exhausted from the motor through the port 13 is carried by a supply line 26 to the reversing valve which directs it through a duct 27 to the exhaust line 15.

When the valve plunger is shifted to the return position the motor connections are reversed, that is, the main pressure line 23 is connected to the motor supply line 26 leading to the port 13 and the motor supply line 24 is connected to the exhaust duct 27 as shown in Fig. 3. The motor is accordingly driven in the reverse direction and imparts return movement to the head.

The shifting of the reversing valve plunger 21 is controlled, in this instance, by a pilot valve 30 preferably of the two-position rotary type. The valve is adapted to be rocked between forward and return positions in timed relation to the reciprocation of the head 5 by control mechanism such as that disclosed in the Caldwell patent previously referred to.

In the forward position of the pilot valve, pressure fluid from the main pressure line 23 is carried by a branch line 31 to the pilot valve and directed by the valve through a pilot line 32, withdrawal valve 33 and pilot line 34 to the upper end of the reversing valve chamber. Fluid is exhausted from the other end of the valve chamber through a pilot line 35 and the pilot valve to the exhaust line 15.

In its alternate or return position, the pilot valve reverses the connections to the valve 20 as shown in Figs. 2 and 3 and the plunger of the latter valve is shifted to the return position, that is, upwardly as viewed in the drawings. The connections between the motor 7 and the source of pressure fluid are thus reversed as above explained.

Preferably, the connections between the pilot lines and the ends of the valve chamber include a pair of branch ducts, one having a check valve 36 interposed therein and the other including an adjustable throttle valve 37. The arrangement is such that unrestricted fluid flow into the valve cylinder is permitted while the exhaust is throttled by the valve 37. The rate at which the valve member is shifted can therefore be controlled precisely by adjustment of the throttle valve. When desired, this valve adjustment may be utilized to effect a gradual or cushioned stop of the head 5 at either or both ends of its reciprocatory stroke.

The invention provides a novel system of control whereby the movement of the head may be interrupted at a precise point without the use of fixed stops or abutments and independently of the adjustment of the reversing valve 20. Moreover, reverse movement of the head may be delayed for a predetermined interval so as to introduce an accurately timed dwell in the translation of the head without affecting the accuracy with which the head is stopped. In the particular hydraulic circuit organization illustrated, the stop and dwell mechanism is arranged to operate at the forward end of the reciprocatory stroke of the head but it will be appreciated that provision may be made for stopping the head at a precise point and for introducing the dwell at either or both ends of the reciprocatory stroke if desired.

The stop and dwell mechanism, in its preferred form, includes a stop valve 40 arranged to control the flow of pressure fluid in the exhaust line from the motor 7. As herein shown, the valve is connected between the duct 27 and the main exhaust line 15 in a position such that it may completely block the motor exhaust and thus stop the motor.

The particular valve illustrated includes a shiftable valve member or plunger 41 enclosed within a cylindrical chamber 42 in the valve housing 22 and having an enlarged section 41' at one end adapted to control fluid flow through a port 43. A coiled spring 44 acting on one end of the plunger yieldably urges it into a position to close the port (Figs. 2 and 5), the tension of the spring being adjustable by means of an adjusting screw 44'. The other end of the valve plunger is formed with a piston enlargement 45.

At the end of the chamber 42 is a substantially smaller cylindrical chamber 47 fitted with an auxiliary plunger 48 positioned to bear against the lower end of the valve plunger 41. A cored passage 49 connects the lower end of the chamber 47 with the main valve chamber into which the branch duct 27 delivers fluid exhausted from the motor 7.

The working areas of the piston 45 and the auxiliary plunger 48 are so proportioned that while a relatively low pressure on the piston is effective to shift the valve member to open position, a substantially higher pressure on the plunger 48 is required for that purpose. In practice, the spring 44 is adjusted so that the pressure on the plunger required for shifting the valve member to open position is slightly higher than the working pressure maintained in the hydraulic system by the relief valve 50. The opening and closing of the valve is therefore normally under control of the piston 45. However, pressure surges in the lines and ducts resulting from the sudden stopping of the motor 7 are prevented from rising to dangerous levels by the operation of the auxiliary plunger in response to an increase in pressure above the normal level.

As long as pressure fluid is supplied to the lower end of the valve chamber 42 (Fig. 1) to maintain sufficient pressure on the piston 45, the valve member 41 is held in open position thus permitting free flow of exhaust fluid from the motor 7. When the pressure on the piston 45 is discontinued, the valve plunger moves instantly to the closed position to effectually block the motor exhaust. As a result, the motor is brought to a quick stop. Accordingly, the point at which the travel of the head is interrupted may be regulated with a high degree of precision by appropriate control of the supply of pressure fluid to the valve chamber 42.

In the exemplary machine, the means provided for controlling the delivery of pressure fluid to the valve chamber 42 is arranged to operate in timed relation with the reciprocation of the head 5. Moreover, this means is additionally timed so as to produce a predetermined dwell in the return movement of the head at the forward end of its reciprocatory stroke. In its preferred form, the control means comprises a control valve 51 having a valve member or plunger 52 shiftable between two operated positions within a chamber 53 formed in the housing 22. A central port in the valve housing is connected by a duct 54 with the stop valve chamber 42 while ports on opposite sides thereof are connected respectively by incoming lines 55 and 56 with the pilot lines 32 and 35. The valve plunger is thus operative to connect one or the other of the pilot lines with the stop valve chamber.

For shifting the valve member 51, pressure fluid is introduced alternately into opposite ends of the valve chamber. In order to coordinate the shifting of the valve member with the movements of the head, the fluid for performing the shifting function is taken from the pilot lines 32 and 35. Thus for shifting the valve member to the right end of the housing as shown in Fig. 1, a fluid connection is extended from the incoming line 55 by way of a branch line 57 and check valve 58 to the left end of the valve chamber. A corresponding connection is provided by a duct 59 between the port connected to the incoming line 56 and the right end of the valve chamber.

It will be observed that check valves 58 and throttle valve 60 are provided at each end of the valve chamber as in the case of the reversing valve 20. This permits convenient adjustment of the shifting rate of the valve member. When used in combination with the stop valve 40 as herein shown, the throttle valve 60 at the left end of the valve housing is utilized only to close off one of the outlets from the valve chamber so that fluid enters and leaves the chamber through the passage controlled by the check valve 58. In other words, the throttle valve is closed under these circumstances and, to take care of the exhaust from the valve chamber, an exhaust line 61 is connected to a port opening at the inner side of the check valve as will be readily seen by reference to Fig. 5. At the same time, the throttle valve at the right end of the valve chamber, while adapted to regulate the rate of movement of the valve member, is opened wide to insure a quick shift of the valve member.

By reason of the presence of the check valve 58 in the incoming fluid circuit, a free flow of pressure fluid to the left end of the valve chamber may be obtained so as to shift the valve member rapidly to the right end of the housing. In the reverse shift of the valve member, the check valve 58 compels the exhaust of fluid through the exhaust line 61 which leads to a delayed action valve 62 having an adjustable restricted orifice 63 which may be set to limit fluid flow as desired and thus delay the movement of the valve member. A fluid line 64 connects the outlet of the valve with the pilot line branch 57.

As shown in Fig. 1, the orifice 63 is formed in a valve member 65 rotatably mounted in a housing 66. The area of the orifice and therefore its timing effect may be adjusted as required by rotation of the valve member. A hand lever 67 on the outer end of the valve member provides means for conveniently effecting such adjustment.

In the operation of the control system, the setting of the pilot valve for forward movement of the head causes pressure fluid to be delivered by way of the pilot lines 32 and 34 to the upper end of the chamber 25 of the reversing valve 20 and by way of branch lines 55 and 57 to the chamber 53 at the left end of the control valve 51. The latter valve directs the fluid from the pilot line by way of duct 54 to the chamber 42 of the stop valve to shift the valve member 41 to open position and thus open the motor exhaust. The plunger of the reversing valve 20 is shifted to the forward position shown in Fig. 1 and directs fluid to the motor 7 so as to run the motor in a direction to advance the head. The movement of the reversing valve plunger may be retarded slightly by appropriate adjustment of the lower throttle valve 37 to effect a smooth, shockless reversal of the head at the outer or right end of its reciprocatory stroke.

As the head approaches the forward end of its stroke, the pilot valve 30 is shifted to the return position as shown in Fig. 2 and directs pressure fluid by way of the pilot line 35 to the lower end of the reversing valve chamber to shift the reversing valve plunger to the return position. In practice, the throttle valve 37 at the upper end of the valve housing is adjusted so as to delay the operation of the valve sufficiently to permit the stop valve 40 to stop the motor 7.

At the same time pressure fluid is delivered to the reversing valve 20, it is also supplied by way of the line 56 and duct 59 to the right end of the control valve 51, thus tending to shift the valve plunger 52 to the left. The shifting of the plunger is delayed, however, due to the necessity of discharging the fluid from the left end of the valve chamber through the restricted orifice 63 of the delayed action valve 62 so that for an appreciable interval the valve plunger remains substantially in the position shown in Fig. 2. While in this position, the control valve maintains the connection between the pilot line 32 and the duct 54. At this time, however, the pilot line 32 is connected to the exhaust line 15 due to the operation of the pilot valve and the application of pressure to the piston 45 of the stop valve is therefore interrupted. Under these conditions, the stop valve plunger 41 immediately closes the port 43 and thus effectually blocks the exhaust from the motor 7. This blocking of the exhaust is timed to occur before the reversing valve 20 has been shifted to reverse position thus enabling the stop valve to quickly stop the motor and thereby interrupt the forward movement of the head 5 at an accurately predetermined point. In the event that a momentary pressure surge is generated by the inertia of the head and motor, the fluid system is protected from injury by a slight opening of the stop valve through the action of the auxiliary plunger 48.

Shortly after the motor is stopped, the reversing valve plunger is shifted to the return position as shown in Fig. 2 but reverse operation of the motor is prevented for the reason that the motor exhaust is still blocked by the stop valve. After a predetermined interval determined by the time required to exhaust the fluid from the left end of the control valve chamber 53 through the delayed action valve 62, control valve plunger 52 shifts to the position shown in Fig. 3, thereby connecting the pilot line 35 with the stop valve chamber 42 to shift the plunger 41 to its upper position and thus open the exhaust line. As the reversing valve plunger is set in the return position, the motor 7 starts and runs reversely, thus returning the head toward the right end of the bed.

The foregoing valve operations are repeated at each end of the reciprocatory stroke of the head 5 thus causing the motor 7 to repeatedly traverse the head back and forth on the bed 6. At the end of a working cycle, movement of the head to a fully retracted position so as to withdraw the tool from the work may be initiated by operation of the withdrawal valve 33. As herein shown, the withdrawal valve 33 is operated by energizing a solenoid 68 arranged to shift the valve member 69 against the action of a biasing spring 70. In its normal position, the valve 33 connects the pilot line 32 through to the pilot line 34, as previously described. When the valve is operated, the plunger 69 blocks the pilot line 32 and connects the pilot line 34 to the exhaust line 15. If this operation occurs during the forward movement of the head, that is, while the pilot valve occupies the position shown in Fig. 1, forward movement of the head continues and the reversing valve is shifted to return position in the usual way at the end of the forward stroke.

At the outer or return end of the working stroke, the operation of the pilot valve 30 is ineffective to shift the reversing valve due to the blocking of the pilot line 32. Accordingly the reversing valve remains in the return position and the head continues its rearward movement beyond the normal working range. When the tool is fully withdrawn from the work, movement of the head is interrupted by suitable control means as shown and described in the Caldwell patent hereinbefore referred to.

To facilitate assembly of the control apparatus, the reversing valve 20, control valve 51 and stop valve 40 are preferably constructed as a single, self-contained structural unit. The present invention provides a multiple valve of this character which is relatively simple and inexpensive to manufacture, which requires a minimum of space and which can be quickly and easily connected up with the other elements of the control system.

As will be seen by reference to Figs. 4–8 of the drawings, the valve body or housing 22 of the improved multiple valve structure consists of a generally rectangular metal block in which three parallel valve chambers are formed as cylindrical bores. The wall of the chamber 25 is grooved in the usual manner for cooperation with the valve plunger 21 in selectively directing the flow of pressure fluid through the valve. The particular valve unit illustrated has a center groove 71 connected with the main pressure line 23 and intermediate grooves 72 and 73 on opposite sides thereof connected, respectively, with the motor supply lines 24 and 26. Grooves 74 and 75 at opposite ends of the chamber are connected by a branched passage with the central part of the stop valve chamber 42, the passage constituting the exhaust duct 27, hereinbefore mentioned. The duct 49 communicating with the auxiliary plunger chamber 47 and the duct 54 extending between the control valve chamber and the stop valve chamber 42 are also formed directly in the valve housing.

Preferably each valve unit of the multiple valve structure is provided with separate end sections removably attached to the housing 22 at the ends of the respective valve chambers. These end sections close the valve chambers and also serve as housings for the auxiliary flow controlling valves associated with the main valve units. Thus, the reversing valve unit 20 has end sections 76 and 77 in which the check valves 36 and throttle valves 37 are incorporated. Similar end sections 78 and 79 incorporating check valves 59 and throttle valves 60 close the ends of the control valve chamber 53. The incorporation of the auxiliary valves in these end sections greatly facilitates manufacture of the valve structure and eliminates external piping connections.

The right end of the stop valve unit 40 (as viewed in Fig. 5) is fitted with an end section 80 having the auxiliary plunger chamber 47 formed therein. This section is also formed with passages adapted to register with the passages in the valve housing constituting the ducts 49 and 54 previously referred to and completes the connection between the ducts and the valve chamber 53. An end section 81 at the other end of the stop valve unit is threaded for the reception of the spring adjusting screw 44'. The inner face of this section is counterbored and has threaded therein a sleeve 82 adapted to enclose and guide the valve biasing spring 44 to prevent lateral deflection of the same.

The incorporation of the three valve units in a single unitary structure which also includes the associated check and throttle valves and other auxiliary devices eliminates a substantial amount of piping and correspondingly reduces the labor involved in assembling the valve unit and in installing the same in the machine. Moreover, by reason of the simplicity of the valve structure and of the fluid connections thereto, parts likely to require adjustment, replacement or repair are always conveniently accessible.

It will be apparent from the foregoing that the invention provides a novel system for controlling the reciprocating movements and the dwell of a hydraulically driven machine tool element. The improved control system utilizes a unitary valve structure of novel and advantageous construction including a stop valve operating in timed relation to the reciprocation of a machine element to quickly and safely stop the driving motor or actuator associated with the element and to delay the restarting of the actuator for a predetermined timed interval. The movements of the machine element may therefore be confined within precisely determined limits while a dwell is interposed at one or both ends of the reciprocating stroke. Accurate stopping of the element is effected without the use of fixed stops or bumpers which materially contributes to smooth, shockless operation of the machine.

The improved control system embodies novel mechanism for timing the dwell of the machine element which mechanism is simple in construction yet efficient and reliable in operation and which has a wide range of adjustability. The mechanism may be readily arranged to operate in timed relation with the direction control valve of the machine to temporarily interrupt the flow of pressure fluid in the hydraulic circuit by which fluid is conveyed to and from the actuator which drives the machine element.

I claim as my invention:

1. The combination with a reciprocable machine element, of a reversible hydraulic motor arranged to reciprocate the machine element, said motor having a pair of fluid ports adapted to be connected alternately to a source of pressure fluid and to an exhaust line, a shiftable reversing valve controlling the connection of the ports with said source and said line, a pressure fluid operated stop valve interposed in the exhaust line, a control valve shiftable with said reversing valve to direct pressure fluid from said source to the stop valve to open the same, and means for delaying the shifting of said control valve so as to temporarily interrupt the supply of pressure fluid to the stop valve, said stop valve closing to block the exhaust line and thereby stop the motor and the machine element for a predetermined interval.

2. The combination with a movable machine element, of a reversible hydraulic actuator arranged to impart forward and return movements to the element, said actuator having a pair of ports acting alternately as inlet and outlet ports in the reverse operation of the actuator, valve means operable to direct pressure fluid to either of said ports selectively while connecting the other port to an exhaust line, a normally open stop valve in the exhaust line, means operating in timed relation to said valve means for closing the stop valve to interrupt the operation of the actuator, and other means operable in response to a predetermined pressure rise in the exhaust line for opening the stop valve.

3. The combination with a movable machine element, of a hydraulic actuator operative to impart forward and return movements to the element, a hydraulically operated reversing valve adapted to control the direction of movement of the element by the actuator, dwell mechanism including a hydraulically operated control valve operative to close the exhaust from said actuator for interrupting the operation of the actuator independently of the setting of the reversing valve, and a pilot valve operable to control the setting of said reversing valve and the operation of said control valve.

4. The combination with a reversible hydraulic motor having ports connectible alternately with a source of pressure fluid and an exhaust line, of a shiftable reversing valve for effecting the connections to the ports selectively, a stop valve connected in the exhaust line, a pilot valve operative to direct pressure fluid to the reversing valve for shifting purposes and to said stop valve for setting the same, and a control valve shiftable in timed relation to the shifting of said reversing valve for controlling the delivery of pressure fluid to said stop valve.

5. The combination with a reversible hydraulic motor, of a shiftable reversing valve controlling the delivery of pressure fluid to and the exhaust of spent pressure fluid from the motor, means for shifting said valve to reverse the supply and exhaust connections to the motor, means operative automatically upon the reversal of the connections to the motor to block the exhaust from the motor and thereby prevent its reverse operation, and a delayed action valve initiated in operation upon the shifting of said reversing valve for reoperating said blocking means to initiate reverse operation of the motor after a predetermined delay.

6. The combination with a movable machine element, of a pressure fluid operated actuator for imparting forward and return movements to the element, said actuator having a pair of fluid ports adapted to be connected alternately to a source of pressure fluid and to an exhaust line to effect said forward and reverse movements of the element, a shiftable reversing valve for controlling the connection of said ports with said pressure fluid source and said exhaust line, a stop valve interposed in the exhaust line and normally set to open the line, said stop valve being operable to close the line, control means operable to initiate the shifting of said reversing valve and the operation of said stop valve in timed relation to the movements of said element, said stop valve being timed to close said exhaust line and thereby interrupt the movement of the element at an accurately predetermined point before said reversing valve is shifted to reverse the connections to said actuator, and control means for reoperating said stop valve to open the exhaust line after a predetermined interval to initiate movement of the element under control of the shifted reversing valve.

7. The combination with a movable machine element, of a pressure fluid operated actuator for imparting forward and return movements to the element, said actuator having a pair of fluid ports adapted to be connected alternately to a source of pressure fluid and to an exhaust line to effect said forward and reverse movements of the element, a shiftable reversing valve for controlling the connection of said ports with said pressure fluid source and said exhaust line, a stop valve interposed in the exhaust line and normally set to open the line, said stop valve being operable to close the line, and control means operable to initiate the shifting of said reversing valve and the operation of said stop valve in timed relation to the movements of said element, said stop valve being timed to close said exhaust line and thereby interrupt the movement of the element at an accurately predetermined point before said reversing valve is shifted to reverse the connections to said actuator.

8. In a machine tool, in combination, a reversible pressure fluid operated actuator, a reversing valve for controlling the direction of movement of said actuator, a stop valve operative to block the exhaust of fluid from said actuator to stop the same, a pilot valve for simultaneously initiating operation of said reversing and stop valves, said stop valve acting quickly to stop the actuator at an accurately predetermined point, and other valve means controlled by said pilot valve for effecting reoperation of said stop valve to condition the actuator for movement under control of said reversing valve.

EARNEST Y. SEBORG.

REFERENCES CITED

The following references are of record in the file of this patent:

UNITED STATES PATENTS

| Number | Name | Date |
| --- | --- | --- |
| 1,893,076 | Flygare | Jan. 3, 1933 |
| 1,943,061 | Douglas | Jan. 9, 1934 |
| 2,071,677 | Wood | Feb. 23, 1937 |
| 2,161,150 | Flygare | June 6, 1939 |
| 2,203,938 | Barrett | June 11, 1940 |
| 2,246,476 | Wood | June 17, 1941 |
| 2,247,479 | Caldwell | July 1, 1941 |
| 2,249,343 | Balsiger | July 15, 1941 |
| 2,271,615 | Bauer | Feb. 3, 1942 |

FOREIGN PATENTS

| Number | Country | Date |
| --- | --- | --- |
| 124,793 | Great Britain | Apr. 10, 1919 |